US008688963B2

(12) United States Patent
Chaudhry et al.

(10) Patent No.: US 8,688,963 B2
(45) Date of Patent: Apr. 1, 2014

(54) CHECKPOINT ALLOCATION IN A SPECULATIVE PROCESSOR

(75) Inventors: Shailender Chaudhry, San Francisco, CA (US); Martin R. Karlsson, San Francisco, CA (US); Sherman H. Yip, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 640 days.

(21) Appl. No.: 12/765,744

(22) Filed: Apr. 22, 2010

(65) Prior Publication Data

US 2011/0264898 A1    Oct. 27, 2011

(51) Int. Cl.
*G06F 9/00* (2006.01)
(52) U.S. Cl.
USPC .......................... 712/228; 712/216; 712/219
(58) Field of Classification Search
USPC ........................................................ 712/228
See application file for complete search history.

(56) References Cited

U.S. PATENT DOCUMENTS

| 5,644,742 | A  | * | 7/1997 | Shen et al. | 712/244 |
|---|---|---|---|---|---|
| 7,487,335 | B1 | * | 2/2009 | Chaudhry et al. | 712/214 |
| 8,392,694 | B2 | * | 3/2013 | Blundell et al. | 712/228 |
| 2003/0056143 | A1 | * | 3/2003 | Prabhu | 714/13 |
| 2004/0133769 | A1 | * | 7/2004 | Chaudhry et al. | 712/233 |
| 2004/0230778 | A1 | * | 11/2004 | Chou et al. | 712/228 |
| 2005/0120191 | A1 | * | 6/2005 | Akkary et al. | 712/217 |
| 2006/0212688 | A1 | * | 9/2006 | Chaudhry et al. | 712/228 |
| 2007/0043934 | A1 | * | 2/2007 | Sodani et al. | 712/228 |
| 2007/0074006 | A1 | * | 3/2007 | Martinez et al. | 712/218 |
| 2007/0186081 | A1 | * | 8/2007 | Chaudhry et al. | 712/214 |
| 2010/0088494 | A1 | * | 4/2010 | Elnozahy | 712/228 |
| 2013/0173885 | A1 | * | 7/2013 | Watanabe et al. | 712/205 |

OTHER PUBLICATIONS

Chaudhry, Shailender et al., "Simultaneous Speculative Threading: A Novel Pipeline Architecture Implemented in Sun's ROCK Processor", Copyright 2009 SUN Microsystems ISCA'09, Jun. 20-24, 2009, Austin, Texas, USA.
Chaudhry, Shailender et al., "Rock: A High-Performance Sparc CMT Processor", IEEE, Mar./Apr. 2009, pp. 6-16.

\* cited by examiner

*Primary Examiner* — Andrew Caldwell
*Assistant Examiner* — Keith Nielsen
(74) *Attorney, Agent, or Firm* — Park, Vaughan, Fleming & Dowler LLP; Anthony P. Jones

(57) ABSTRACT

The embodiments described in the instant application provide a system for generating checkpoints. In the described embodiments, while speculatively executing instructions with one or more checkpoints in use, upon detecting an occurrence of a predetermined operating condition or encountering a predetermined type of instruction, the system is configured to determine whether an additional checkpoint is to be generated by computing a factor based on one or more operating conditions of the processor. When the factor is greater than a predetermined value, the processor is configured to generate the additional checkpoint.

20 Claims, 3 Drawing Sheets

CHECKPOINT ALLOCATION IN A SPECULATIVE PROCESSOR

RELATED APPLICATIONS

This application is related to U.S. Pat. No. 7,571,304, entitled "Generation of Multiple Checkpoints in a Processor that Supports Speculative Execution," filing date 18 Mar. 2005, by inventors Shailender Chaudhry, Marc Tremblay, and Paul Caprioli.

BACKGROUND

1. Field

The described embodiments relate to computer systems. More specifically, the described embodiments relate to techniques for allocating checkpoints in speculative processors.

2. Related Art

Some modern microprocessors support speculatively executing program code. This generally involves executing instructions speculatively while preserving a pre-speculation architectural state of the processor. This enables the processor to discard speculative results and return to the pre-speculation architectural state if certain conditions occur during speculative execution (e.g., encountering an error/trap, a coherence violation, unavailability of processor hardware resources, executing certain types of instructions, etc.).

Some processors that support speculative execution use checkpoints to preserve the pre-speculation architectural state. These processors typically include mechanisms to generate checkpoints while speculatively executing instructions. For example, some processors include copies of one or more processor structures (register files, state registers, etc.) in which the pre-speculation architectural state is preserved during speculative execution.

Some processors that support speculative execution further provide processor structures to support multiple checkpoints. These processors can include multiple copies of the processor structures for generating checkpoints. These processors can use each of the available checkpoints to preserve the architectural state of the processor at a given point in time. In these processors, one or more checkpoints can be in use simultaneously.

When the checkpoints in a multiple-checkpoint processor are generated at appropriate times, the performance of the processor can be significantly improved. However, determining when to generate a checkpoint to maximize performance gains can be unclear, and generating checkpoints at incorrect times can significantly reduce the performance improvements. For example, when checkpoints are generated too often, the processor may run out of checkpoints and will be unable to generate subsequent checkpoints (until a checkpoint is cleared). Alternatively, if checkpoints are not generated often enough, when the speculative execution fails, the processor may be forced to re-execute a large number of instructions.

SUMMARY

The described embodiments provide a system for generating checkpoints. In the described embodiments, while speculatively executing instructions with one or more checkpoints in use, upon detecting an occurrence of a predetermined operating condition, a processor in the system is configured to determine whether an additional checkpoint is to be generated by computing a factor based on one or more operating conditions of the processor. When the factor exceeds a predetermined value, the processor is configured to generate the additional checkpoint.

In some embodiments, when detecting the occurrence of the predetermined operating condition, the processor is configured to determine that one or more hardware structures in the processor are likely to be unavailable for future speculative use.

In some embodiments, when determining that the one or more hardware structures in the processor are likely to be unavailable, the processor is configured to determine that one or more of a store queue or a deferred queue have reached a predetermined level of fullness during speculative execution.

In some embodiments, the processor is further configured to dynamically compute the predetermined level of fullness for the deferred queue and the store queue based on a likelihood of overflowing the queue. The likelihood of overflowing the queue can be computed based on at least one of: (1) a number of previous overflows or no-overflows; (2) a number of slots available in the queue; (3) a number of instructions in a pipeline in the processor that will use a slot in the queue; (4) a drain rate of the queue; or (5) a bandwidth availability of one or more subsystems used to drain the queue.

In some embodiments, when detecting the occurrence of the operating condition, the processor is configured to determine that one or more instructions have been encountered that are likely or guaranteed to cause the processor to return to a checkpoint.

In some embodiments, the predetermined type of instruction includes one of: (1) a divide instruction; (2) a register window RESTORE instruction following a register window SAVE instruction, wherein both instructions are executed during speculative execution; a divide instruction; or (3) a COMMIT instruction.

In some embodiments, the processor includes a branch fail cache, wherein the branch fail cache includes a set of entries, each of which can hold an identifier of a branch instruction that was mispredicted in previous execution of the branch instruction. In these embodiments, when detecting the occurrence of the predetermined operating condition, the processor is configured to determine that a branch instruction has been encountered, and to check the branch fail cache for an entry that includes an identifier for the branch instruction. The processor then detects the occurrence of the predetermined operating condition when an entry in the branch fail cache indicates that the branch was previously mispredicted.

In some embodiments, the processor is configured to compute a number of instructions at which a checkpoint is to be generated using a mathematical formula. In these embodiments, the processor is configured to detect the occurrence of the predetermined operating condition when the processor has executed the computed number of instructions without generating a checkpoint. In some embodiments, the mathematical formula includes at least one variable that is set based on at least one operating condition of the processor.

In some embodiments, when computing the factor based on the one or more operating conditions of the processor, the processor is configured to compute an output of a function, wherein a set of inputs to the function includes one or more values representing: (1) a prior or present performance of the processor; (2) a number of remaining checkpoints; (3) a number or type of instructions that have been executed since a previous checkpoint was generated; (4) a number or type of computational operations that have occurred since a previous checkpoint was generated; (5) a user-input adjustment; (6) a processing-system-specific adjustment; or (7) the predetermined operating condition.

BRIEF DESCRIPTION OF THE FIGURES

In the figures, like reference numerals refer to the same figure elements.

DETAILED DESCRIPTION

Figure 1:
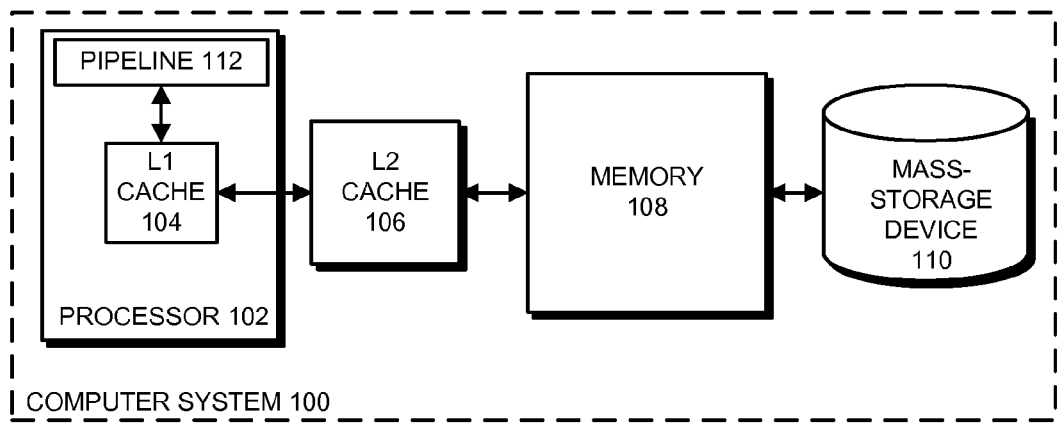
FIG. 1 presents a block diagram of a computer system in accordance with the described embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description can be stored on a computer-readable storage medium. The computer-readable storage medium can include any device or medium (or combination of devices and/or mediums) that can store data structures and code for use by a computer system. For example, the computer-readable storage medium can include volatile memory or non-volatile memory, including flash memory, random access memory (RAM, SRAM, DRAM, RDRAM, DDR/DDR2/DDR3 SDRAM, etc.), magnetic or optical storage mediums (e.g., disk drives, magnetic tape, optical discs (e.g., compacts discs (CDs), digital video discs (DVDs)), or other mediums capable of storing data structures or code.

The methods and processes described in the following description can be embodied as program code that is stored in a computer-readable storage medium. When a computer system (see, e.g., computer system 100 in FIG. 1) reads and executes the program code stored on the computer-readable storage medium, the computer system performs the methods and processes in the program code stored in the computer-readable storage medium.

The methods and processes described in the following description can be included in hardware modules. For example, the hardware modules can include, but are not limited to, microprocessors, application-specific integrated circuit (ASIC) chips, field-programmable gate arrays (FPGAs), and other programmable-logic devices now known or later developed. When the hardware modules are activated, the hardware modules perform the methods and processes included within the hardware modules. In some embodiments, the hardware modules include one or more general-purpose circuits that can be configured by executing instructions to perform the methods and processes.

Terminology

The following description includes a number of terms for which the definitions are generally known in the art. However, the following definitions are provided to clarify the subsequent description.

A "thread" is a software entity that can be run on hardware. For example, a software process can be executed using one or more software threads.

A "strand" includes hardware for holding information that is used to execute a thread. More specifically, a strand includes the software-visible architectural state of a thread, along with any other architectural state for the thread's execution. For example, a strand can include a program counter (PC), a next program counter (NPC), and one or more general-purpose registers, floating-point registers, condition-code registers, status registers, or ancillary state registers (ASRs).

The "architectural state" of a processor includes the values, state, and settings that have been committed to corresponding structures on the processor. The values, state, and settings from the architectural state can be freely used by the processor to perform operations. For example, a processor's architectural state can include the values in memories, registers, flags, variables, counters, and other hardware structures and/or software variables.

Computer System

FIG. 1 presents a block diagram of a computer system 100 in accordance with the described embodiments. Computer system 100 includes processor 102, L2 cache 106, memory 108, and mass-storage device 110. Processor 102 includes L1 cache 104 and pipeline 112.

Processor 102 can include any device that is configured to perform computational operations. For example, processor 102 can be a central processing unit (CPU) such as a microprocessor. As another example, processor 102 can be a controller or an application-specific integrated circuit.

Mass-storage device 110, memory 108, L2 cache 106, and L1 cache 104 are computer-readable storage mediums that collectively form a memory hierarchy in a memory subsystem that stores data and instructions for processor 102. Generally, mass-storage device 110 is a high-capacity, non-volatile memory, such as a disk drive or a large flash memory, with a large access time, while L1 cache 104, L2 cache 106, and memory 108 are smaller, faster memories that store copies of frequently used data. For example, memory 108 can be a dynamic random access memory (DRAM) structure that is larger than L1 cache 104 and L2 cache 106, whereas L1 cache 104 and L2 cache 106 can include smaller static random access memories (SRAMs). In some embodiments, L2 cache 106, memory 108, and mass-storage device 110 are shared among one or more processors in computer system 100. Such memory structures are well-known in the art and are therefore not described in more detail.

Computer system 100 can be incorporated into many different types of electronic devices. For example, computer system 100 can be part of a desktop computer, a laptop or tablet computer, a server, a media player, an appliance, a cellular phone, a piece of testing equipment, a network appliance, a calculator, a personal digital assistant (PDA), a hybrid device (i.e., a "smart phone"), a guidance system, a toy, audio/video electronics, a video game system, a control system (e.g., an automotive control system), or another electronic device.

Although we use specific components to describe computer system 100, in alternative embodiments, different components can be present in computer system 100. For example, computer system 100 can include video cards, network cards, optical drives, network controllers, Input/Output (I/O) devices, and/or other peripheral devices that are coupled to processor 102 using a bus, a network, or another suitable communication channel. Alternatively, computer system 100 may include more or fewer of the elements shown in FIG. 1. For example, computer system 100 may include additional processors 102, and the processors 102 may share some or all of L2 cache 106, memory 108, and mass-storage device 110 and/or may include some or all of their own memory hierarchy.

Figure 2:
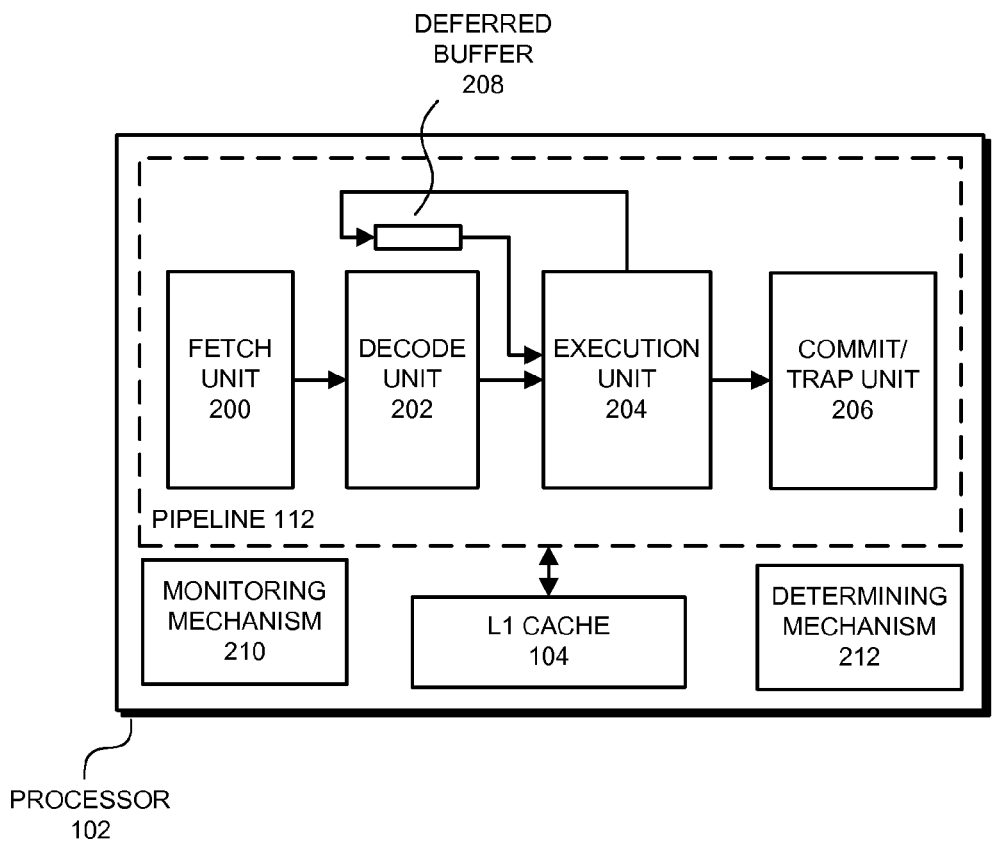
FIG. 2 presents a block diagram of a processor with an expanded view of a pipeline in accordance with the described embodiments.

FIG. 2 presents a block diagram of processor 102 with an expanded view of pipeline 112 in accordance with the described embodiments. Generally, pipeline 112 is an instruction execution pipeline that includes a number of stages for executing program code. The stages in pipeline 112 are coupled in series, with the output of a given stage coupled to the input of a next stage. Instructions progress through each stage of the pipeline to complete a corresponding part of executing the instruction.

Pipeline 112 includes fetch unit 200, decode unit 202, execution unit 204, and commit/trap unit 206. Fetch unit 200 fetches instructions from L1 cache 104 (or, if necessary, from other levels of the memory hierarchy) for execution. Decode unit 202 decodes the fetched instructions and prepares the instructions for execution by execution unit 204. Execution unit 204 executes the instructions forwarded from decode unit 202. Execution unit 204 can include one or more floating point execution units, integer execution units, branch execution units, and/or memory execution units (e.g., load/store execution units) for executing the instructions. Commit/trap unit 206 retires successfully executed instructions (i.e., commits the results to the architectural state of processor 102 and computer system 100) and handles traps/errors that arise during the execution of instructions.

Pipeline 112 also includes deferred buffer 208. In the described embodiments, if an instruction cannot be executed due to an unresolved data dependency, such as an operand that has not returned from a load operation or a translation lookaside buffer miss, processor 102 defers execution of the instruction and places the instruction into deferred buffer 208. In other words, because the instruction with the unresolved dependency cannot yet be executed by execution unit 204 due to the unresolved data dependency, the instruction is forwarded from execution unit 204 along the path shown in FIG. 2 to deferred buffer 208. When the data dependency is eventually resolved, instructions from deferred buffer 208 are executed in program order with respect to other deferred instructions, but not with respect to other previously executed non-deferred instructions. This process is described in more detail below with reference to FIG. 3.

Note that pipeline 112 is simplified for the purposes of illustration. In alternative embodiments, pipeline 112 can contain other stages (units), functional blocks, mechanisms, and/or circuits. The units, functional blocks, mechanisms, and/or circuits that can be used in a pipeline are known in the art and hence are not described in detail.

In some embodiments, processor 102 includes a checkpoint-generation mechanism (not shown). This checkpoint-generation mechanism includes one or more register files, memories, tables, lists, or other structures that facilitate saving a copy of the architectural state of processor 102. In these embodiments, when commencing speculative execution (e.g., execution in execute-ahead mode 302 or scout mode 306 (see FIG. 3), or when commencing a transaction), the checkpoint-generation mechanism can perform operations to checkpoint the architectural state of processor 102. Generally, the architectural state can include copies of all processor 102's hardware structures, memories, registers, flags, variables, counters, etc., that are useful or necessary for restarting processor 102 from the pre-speculation architectural state.

In some embodiments, the checkpoint-generation mechanism does not immediately copy values to preserve the pre-speculation architectural state. Instead, in these embodiments, the architectural state is only preserved as necessary. For example, before a register, counter, variable, etc., is overwritten or changed during speculative execution, the checkpoint-generation mechanism can preserve a copy. In some embodiments, the checkpoint-generation mechanism is distributed among one or more of the sub-blocks of processor 102.

In the described embodiments, processor 102 includes a monitoring mechanism 210. In these embodiments, monitoring mechanism 210 monitors operating conditions during execution and/or instructions that are being executed on processor 102 to determine when an additional checkpoint can be generated by processor 102 in order to enable processor 102 to preserve the then-current architectural state. Monitoring mechanism 210 can detect operating conditions and/or instructions, or a combination thereof, that indicate that a most-recently generated checkpoint may be restored in processor 102. In other words, monitoring mechanism 210 can monitor processor 102 to determine when a return to a checkpointed state is either very likely or certain to happen. Monitoring mechanism 210 can then signal processor 102 to generate a checkpoint. This can help to prevent processor 102 returning to a checkpoint that was generated many instructions before, thereby avoiding the need for processor 102 to re-perform large blocks of computational work.

Note that, although we present a single, separate monitoring mechanism 210, in some embodiments, some or all of monitoring mechanism 210 can be included in other functional blocks (e.g., L2 cache 106, pipeline 112, fetch unit 200, etc.) in processor 102 or computer system 100. We present monitoring mechanism 210 in the illustrated form to clarify the description of the functions performed by monitoring mechanism 210. However, alternative embodiments where monitoring mechanism 210 is located in one or more functional blocks in processor 102 or computer system 100 function in a similar way.

In some embodiments, processor 102 includes a determining mechanism 212. In these embodiments, upon receiving the signal from monitoring mechanism 210 that a checkpoint can be generated, processor 102 queries determining mechanism 212 to determine whether a checkpoint is to be generated. Determining mechanism 212 then computes a factor that indicates whether the checkpoint is to be generated. Based on the value of the factor, determining mechanism 212 signals processor 102 that the checkpoint is, or is not, to be generated.

In computing the factor, determining mechanism 212 can take as input any value(s) that indicate a current operating state of processor 102. For example, determining mechanism 212 can take as inputs: (1) the number of checkpoints remaining (unset checkpoints, as described below); (2) the type of condition and/or instruction that led to the checkpoint signal from monitoring mechanism 210; (3) one or more operating conditions of processor 102 or computer system 100 (memory system bandwidth, cache misses, cycles-per-instruction, etc.); or (4) number of instructions since the most-recently generated checkpoint. Generally, the values used as inputs by determining mechanism 212 can include any value that can be used to determine whether generating a checkpoint could enable processor 102 to avoid losing computational work.

The factor computed by determining mechanism 212 can be any value that determining mechanism 212 can interpret to determine whether a checkpoint should be generated based on the operating conditions and/or instructions that monitoring mechanism 210 detected. For example, the factor can be a value between 0 and 1, with each input being a value less than one, where determining mechanism 212 sums or otherwise mathematically combines each of the inputs to determine the factor. In these embodiments, when the value is within a predetermined threshold of 1 (e.g., within 0.4 of 1), the checkpoint is generated, whereas the checkpoint may not be generated if the value is below the threshold. Alternatively, determining mechanism 212 can use another arithmetic or mathematical formula (e.g., can individually weight the inputs and sum the input values, etc.) to compute a value for the factor.

Figure 5:
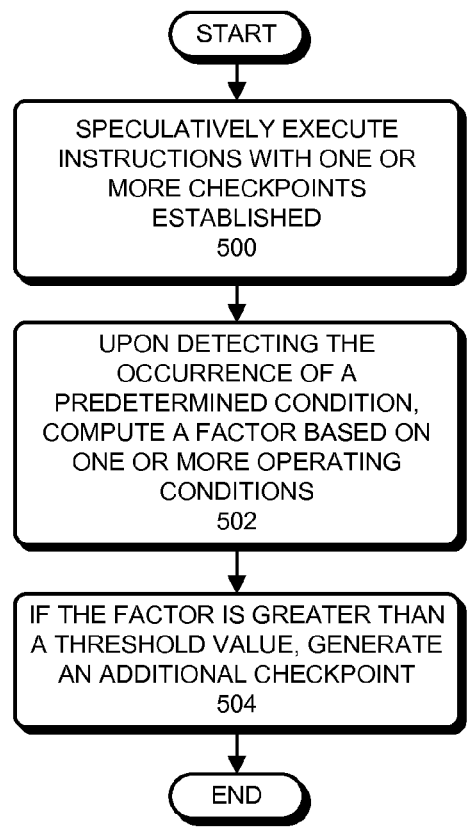
FIG. 5 presents a flowchart illustrating a process for generating an additional checkpoint in a processor that supports speculative execution in accordance with the described embodiments.

In some embodiments, computer system 100 further includes mechanisms (functional blocks, circuits, etc.) for operating in an execute-ahead mode 302, a deferred-execution mode 304, and a scout mode 306 (see FIG. 5). Exemplary embodiments of a system that supports an execute-ahead mode and a deferred-execution mode are described in U.S. Pat. No. 7,114,060, entitled "Selectively Deferring Instructions Issued in Program Order Utilizing a Checkpoint and Multiple Deferral Scheme," by inventors Shailender Chaudhry and Marc Tremblay, which is hereby incorporated by reference to describe some mechanisms and processes of operating in execute-ahead mode and deferred-execution mode. Exemplary embodiments of a system that supports a scout mode are described in more detail in U.S. Pat. No. 6,415,356, entitled "Method and Apparatus for Using an Assist Processor to Pre-Fetch Data Values for a Primary Processor," by inventors Shailender Chaudhry and Marc Tremblay, which is hereby incorporated by reference to describe some mechanisms and processes of operating in scout mode.

Note that, although we provide the above-described references as examples of a system that supports execute-ahead mode and deferred-execution mode, numerous other publications, conference papers, patent publications, and issued patents describe additional aspects of the execute-ahead mode and the deferred-execution mode. See, for example, U.S. Pat. No. 7,293,161, entitled "Deferring Loads and Stores When a Load Buffer or Store Buffer Fills During Execute-Ahead Mode," by inventors Shailender Chaudhry, Marc Tremblay, and Paul Caprioli, or U.S. Pat. No. 7,487,335, entitled "Method and Apparatus for Accessing Registers During Deferred Execution," by inventors Shailender Chaudhry, Syed I. Haq, Mohammed M. Rahman, and Khanh Luu.

In addition, although we provide the above-described references as examples of a system that supports scout mode, numerous other publications, conference papers, patent publications, and issued patents describe additional aspects of the scout mode. See, for example, U.S. patent publication no. 2004/0133769, entitled "Generating Prefetches by Speculatively Executing Code Through Hardware Scout Threading," by inventors Shailender Chaudhry and Marc Tremblay, or U.S. patent publication no. 2004/0133767, entitled "Performing Hardware Scout Threading in a System that Supports Simultaneous Multithreading," by inventors Shailender Chaudhry and Marc Tremblay.

Speculative Execution

Figure 3:
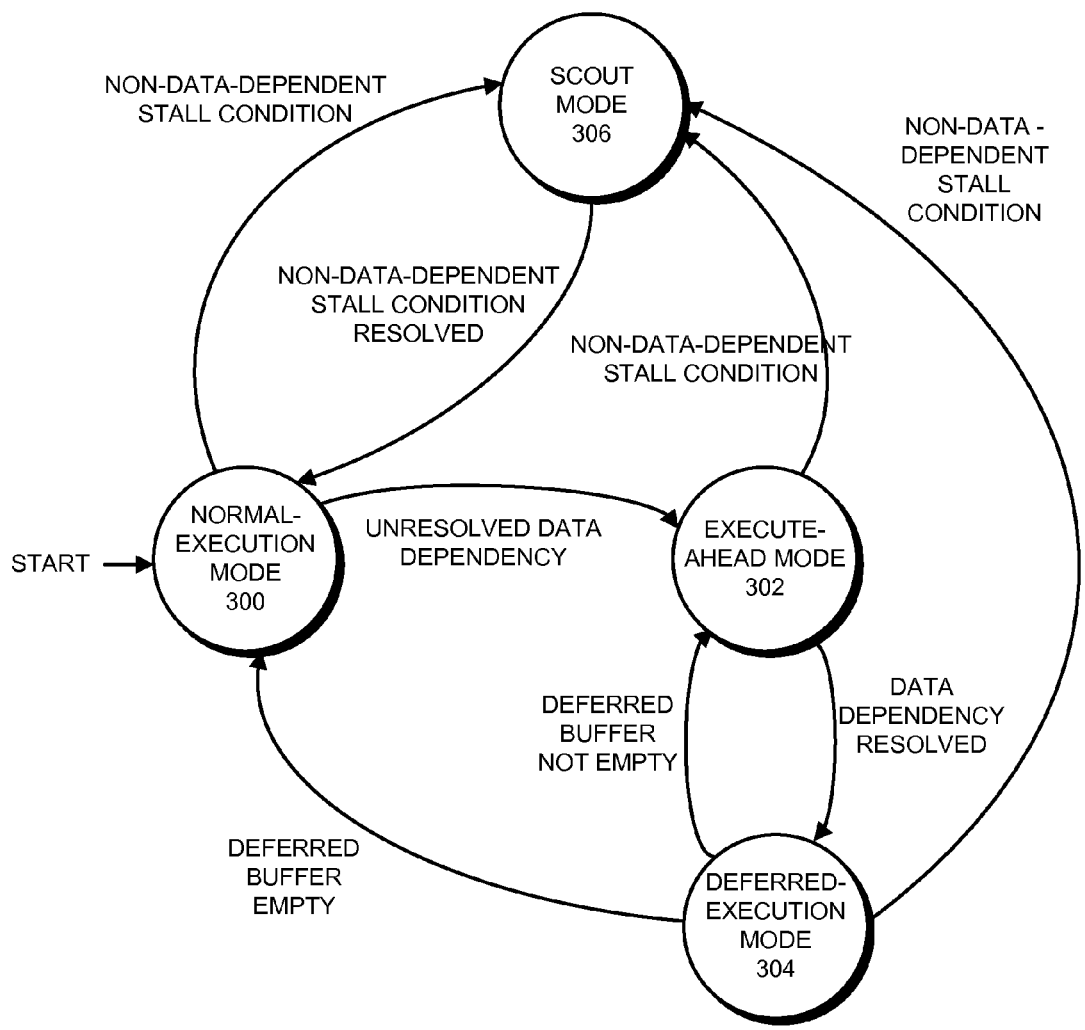
FIG. 3 presents a state diagram which includes a normal-execution mode, an execute-ahead mode, a deferred-execution mode, and a scout mode in accordance with the described embodiments.

FIG. 3 presents a state diagram which includes a normal-execution mode 300, an execute-ahead mode 302, a deferred-execution mode 304, and a scout mode 306 in accordance with the described embodiments. Generally, the described embodiments can operate in execute-ahead mode 302 or deferred-execution mode 304 to speculatively execute program code following a data-dependent stall condition in normal-execution mode 300. In addition, the described embodiments can operate in scout mode 306 to speculatively execute program code following a non-data-dependent stall condition in normal-execution mode 300, execute-ahead mode 302, or deferred-execution mode 304. Using speculative execution, these embodiments can perform useful computational work in cases where some existing processors are stalled waiting for a stall condition to be resolved so that subsequent instructions can be executed.

As shown in FIG. 3, processor 102 initially executes program code in normal-execution mode 300. In normal-execution mode 300, processor 102 executes instructions from program code in program order and commits results from executing instructions to the architectural state of processor 102.

Upon encountering an unresolved data dependency during execution of an instruction in normal-execution mode 300, processor 102 transitions to execute-ahead mode 302. In the described embodiments, an unresolved data dependency can include, but is not limited to: (1) a use of an operand that has not returned from a preceding load miss (e.g., a D-cache miss); (2) a use of an operand that has not returned from a preceding data translation lookaside buffer (DTLB) miss; (3) a use of an operand that has not returned from a preceding full or partial read-after-write (RAW) from store buffer operation; and (4) a use of a result from a prior instruction (as an operand) that was subject to an unresolved data dependency.

When transitioning to execute-ahead mode 302, processor 102 generates a checkpoint that can be used to restore a pre-speculation architectural state to processor 102. Generating the checkpoint involves preserving the architectural state of processor 102 to facilitate subsequent recovery should a need arise to return to the pre-speculation state during execute-ahead mode 302, deferred-execution mode 304, or scout mode 306.

In addition, because the instruction with the unresolved data dependency cannot be executed until the data dependency is resolved, execution unit 204 forwards the instruction to deferred buffer 208. The instruction is then stored in deferred buffer 208 until the data dependency is resolved. (We call this operation "deferring" the instruction, and refer to such an instruction as a "deferred instruction.")

By deferring the instruction with the unresolved data dependency, processor 102 frees execution unit 204 to speculatively execute subsequent non-dependent instructions. Hence, in execute-ahead mode 302, processor 102 continues to execute subsequent instructions in program order. While executing subsequent instructions, any instructions that cannot be completed because of an unresolved data dependency or a dependency on a result of a prior deferred instruction are not executed, but are instead also deferred and placed in deferred buffer 208.

While operating in execute-ahead mode 302, processor 102 monitors for data returns (e.g., a cache line or a DTLB translation returned to processor 102 from computer system 100 in response to a request, etc.). Upon detecting a data return, processor 102 transitions to deferred-execution mode 304.

In deferred-execution mode 304, processor 102 attempts to execute deferred instructions from deferred buffer 208 in program order. Processor 102 attempts to execute these instructions in program order with respect to other deferred instructions in deferred buffer 208 (i.e., deferred buffer 208 is a first-in-first-out buffer), but not with respect to other previously executed non-deferred instructions (and not with respect to deferred instructions executed in previous passes through deferred buffer 208). More specifically, during a deferred-execution mode episode, processor 102 issues each instruction from deferred buffer 208 to execution unit 204 in the order in which they were stored in deferred buffer 208. Note that, while issuing instructions from deferred buffer 208, processor 102 may prevent the front end of pipeline 112 (i.e., instruction fetch unit 200 and instruction decode unit 202) from forwarding instructions to instruction execution unit 204, so that the only instructions executed by execution unit 204 during the deferred-execution mode 304 are issued from deferred buffer 208.

While attempting to execute each instruction from deferred buffer 208 in deferred-execution mode 304, upon encountering an instruction for which the data dependency has not yet been resolved, processor 102 re-defers execution and places the re-deferred instruction back into deferred buffer 208. (Note that processor 102 executes the other instructions that can be executed in program order with respect to each other.)

After the system completes a pass through deferred buffer 208, if deferred buffer 208 is empty, the system transitions to normal-execution mode 300. This may involve committing changes made during execute-ahead mode 302 and deferred-execution mode 304 to the architectural state of the processor, if such changes have not been already committed. Returning to normal-execution mode 300 can also involve deleting the checkpoint generated when the system moved into execute-ahead mode 302.

On the other hand, if deferred buffer 208 is not empty after the system completes a pass through deferred buffer 208, the system returns to execute-ahead mode 302 to execute instructions from the point where the execute-ahead mode 302 left off (i.e., processor 102 resumes fetching and executing instructions from the last instruction executed in execute-ahead mode 302 before the deferred-execution mode episode was started). Note that in some embodiments processor 102 does not resume execute-ahead mode 302, but instead stalls until another data return occurs (and then starts another deferred-execution mode episode).

Some embodiments also support a scout mode 306. If a non-data-dependent stall condition arises during normal-execution mode 300, execute-ahead mode 302, or deferred-execution mode 304, these embodiments can transition to scout mode 306 to speculatively execute instructions. In these embodiments, upon resolving the non-data-dependent stall condition, processor 102 restores the checkpointed architectural state and resumes operation in normal-execution mode 300. Note that restoring the checkpointed architectural state and resuming operation in normal-execution mode 300 involves overwriting or ignoring the speculative results generated during execute-ahead mode 302 and deferred-execution mode 304.

Note that in some embodiments, although not shown in FIG. 3, upon encountering certain operating conditions and/or instructions while speculatively executing program code, processor 102 can immediately restore the most-recently generated checkpoint and resume operation in normal-execution mode 300. For example, in some embodiments, upon determining that a hardware resource is unavailable (busy, overflowed, etc.) while speculatively executing instructions, processor 102 can immediately restore the checkpoint. In some embodiments, this can happen when the store buffer overflows or when the deferred queue overflows.

In addition, as described in more detail below, in the described embodiments processor 102 supports generating multiple simultaneous checkpoints. Thus, in addition to the checkpoint generated when commencing speculative execution, processor 102 can generate a number of additional checkpoints to preserve the speculative architectural state while speculatively executing instructions in the execute-ahead mode 302 and/or the deferred-execution mode 304.

Simultaneous Speculative Threading

Some of the described embodiments support simultaneous speculative threading (SST) wherein two or more strands are used to execute a single thread. For example, some embodiments use a primary/ahead strand and a subordinate/clean-up strand to execute the thread. In these embodiments, during operation, the primary strand can be used to execute instructions for the thread while the subordinate strand is idle or is performing other computational work. Upon encountering an instruction with an unresolved data dependency with the primary strand (e.g., a load instruction that misses in a local cache), these embodiments defer the instruction by placing the instruction into a deferred queue and continue (speculatively) executing subsequent instructions using the primary strand. Then, while executing subsequent instructions using the primary strand, these embodiments defer each instruction that has an unresolved dependency (e.g., a dependency on an already-deferred instruction). Next, when data returns for a deferred instruction, these embodiments use the subordinate strand to make one or more passes through the deferred queue to execute deferred instructions that depended on the data (while using the primary strand to continue to execute instructions).

Note that, although we describe embodiments that use two strands to execute a single thread, alternative embodiments can use more than two strands. For example, some embodiments can use two or more strands as a primary strand and/or a subordinate strand. In addition, note that the designations "primary strand" and "subordinate strand" used in this description do not indicate a particular strand. In general, any strand can function as a primary strand or a subordinate strand. In some embodiments, a strand can be switched between being a primary strand and a subordinate strand during operation.

The mechanisms and operations involved in simultaneous speculative threading are described in U.S. patent application publication 2010/0031084, entitled "Checkpointing in a Processor that Supports Simultaneous Speculative Threading," by inventors Marc Tremblay and Shailender Chaudhry, and the paper "Simultaneous Speculative Threading: A Novel Pipeline Architecture Implemented in Sun's Rock Processor," by Shailender Chaudhry, Robert Cypher, Magnus Ekman, Martin Karlsson, Anders Landin, Sherman Yip, Hakan Zeffer, and Marc Tremblay, ACM SIGARCH Computer Architecture News, vol. 37, issue 3, pages 484-495, published 2009, which are hereby incorporated by reference to describe SST. Note that although we use these references, simultaneous speculative threading is also described in numerous other patent application publications, conference papers, and white papers.

Transactional Execution

Some of the described embodiments support transactional execution. During transactional execution, these embodiments execute a critical section of code as a transaction. While executing the transaction, these embodiments protect transactional memory accesses (i.e., loads or stores performed by instructions in the critical section) from interfering accesses by other threads and enforce the appearance of atomicity of the critical section with respect to other threads. In these embodiments, a "critical section" can be any section of the code that is to be protected from interference by other threads. For example, a critical section can include a single instruction or a number of instructions.

Generally, before a transaction starts, these embodiments checkpoint the architectural state of the processor to enable the recovery of the pre-transactional state in case the transaction fails. Then, during the transaction, these embodiments buffer transactional results to enable the results to be discarded in case the transaction fails. These embodiments also monitor accessed cache lines to determine whether another thread has interfered with the transaction. If the transaction completes without interference from another thread, these embodiments atomically commit the buffered transactional results to the architectural state of processor 102 and continue executing the code following the critical section. Otherwise, the transaction fails and these embodiments delete the buffered transactional results, use the checkpoint to restore the pre-transactional state, and resume execution just before the critical section. Note that the transaction also fails if the atomic commitment of the results to the architectural state fails.

The mechanisms and operations for executing program code in a transaction are described in U.S. Pat. No. 6,862,664, entitled "Method and Apparatus for Avoiding Locks by Speculatively Executing Critical Sections," by inventors Shailender Chaudhry, Marc Tremblay, and Quinn Jacobson; U.S. Pat. No. 7,500,086, entitled "Start Transactional Execution (STE) Instruction to Support Transactional Program Execution," by inventors Marc Tremblay, Shailender Chaudhry, and Quinn Jacobson; and the paper "Transactional Memory for a Modern Microprocessor," by Marc Tremblay, Keynote at Principles of Distributed Computing (PODC), Portland, Oreg. August 2007, which are hereby incorporated by reference to describe transactional execution. Note that although we use these references transactional execution (interchangeably called "transactional memory") is also described in numerous other patents, patent application publications, conference papers, and white papers.

Generating Checkpoints

As described above, the described embodiments support generating checkpoints. Generally, generating a checkpoint involves preserving the architectural state of processor 102 at a given time. The preserved architectural state can then be restored and used to resume execution in the state that processor 102 was in at the given time. The architectural state includes the values and information in memories, registers, flags/indicators, variables, counters, and/or other states from software/hardware mechanisms that are useful or necessary for restarting processor 102 from the preserved architectural state.

In some embodiments, generating the checkpoint involves "eagerly" preserving the architectural state. In these embodiments, when generating a checkpoint processor 102 immediately copies the then-present architectural state of processor 102 to a backup or shadow copy. For example, processor 102 can copy the processor register files to a backup copy of the register files, copy processor state information (flags, variables, counters, etc.) to a backup copy of the processor state information, and otherwise make a coherent copy of processor 102's architectural state at that point in time.

In alternative embodiments, generating the checkpoint involves "lazily" preserving the architectural state. In these embodiments, preserving the architectural state involves saving the architectural state to be preserved as new or updated values are written to the architectural state. In other words, in these embodiments, a full copy of the architectural state is not made immediately. Instead, as each portion of the architectural state is updated during speculative execution, processor 102 preserves a copy of the original value.

In some embodiments, in order to enable generating checkpoints, processor 102 maintains copies of the architectural state in two or more locations (at least one copy for each checkpoint supported by processor 102). In these embodiments, as some portion of the architectural state is updated in processor 102 (before a checkpoint is generated), processor 102 updates that portion of the architectural state in each of the copies of the architectural state, keeping each of the copies consistent with the then-current architectural state. For example, if a register is updated with a new value, processor 102 can update the active register and each copy of the active register.

In these embodiments, when generating a checkpoint, instead of performing a copy operation to preserve the architectural state, processor 102 simply freezes one of the copies/locations, thereby preserving the architectural state of processor 102 at that point in time. When speculation is completed and the checkpointed/frozen copy of the architectural state is no longer useful, processor 102 can unfreeze the copy and update the copy (copy the values from one copy of the architectural state to the other) to match the active architectural state. Otherwise, if speculation fails (e.g., if a condition is encountered during speculation that causes processor 102 to restore the checkpointed state) processor 102 can switch the frozen copy to be the architectural state, and can update the previous architectural state to match the unfrozen copy.

In some embodiments, in order to enable generating checkpoints, processor 102 includes several full or partial shadow copies of architectural state that are not maintained in parallel with the architectural state of processor 102 (unlike the embodiments described in the prior paragraph). In these embodiments, upon generating a checkpoint, processor 102 switches to one of the shadow copies and begins to write speculative results to the shadow copy, leaving the pre-speculation values in the architectural state. In these embodiments, when reading operands or processor state, processor 102 uses the speculative value if one exists, but otherwise reads the value from the preserved architectural state of processor 102. When speculation is completed and the checkpointed architectural state is no longer useful, processor 102 can join or merge the shadow copy with the architectural copy. Otherwise, if speculation fails processor 102 can simply invalidate the shadow copy and return to using the preserved architectural state.

In some of these embodiments, the shadow copy is not set, so upon successfully completing speculation, processor 102 can continue to use what was the shadow copy as the architectural state, while changing the designation of the prior architectural state to be a shadow copy. In some embodiments, this designation can be fine-grained. For example, processor 102 can include a copy of each register in the processor register file for each supported checkpoint and each register can include an indicator bit indicating that the register is the architectural copy. In these embodiments, processor 102 can simply update the bits in the copies of the register to change the designation of a given register to being the register for the architectural state of processor 102.

In some embodiments, upon generating a checkpoint, processor 102 makes a full copy of the architectural state into a shadow copy. Processor 102 then uses the architectural state for speculative values. If speculation is successful, processor 102 can continue to use the architectural state. Otherwise, if speculation fails, processor 102 can copy the preserved architectural state from the backup copy to the architectural state, overwriting (and thereby discarding) the speculative values.

Multiple Checkpoints

In the described embodiments, processor 102 supports generating multiple simultaneous checkpoints. In other words, in these embodiments, processor 102 can generate first checkpoint and, while the first checkpoint remains in use/set, can generate a one or more additional checkpoints. As with the checkpoints described above, each of the multiple checkpoints preserves the architectural state present in processor 102 at the time the checkpoint was generated. Each checkpoint can therefore be restored to return processor 102 to the architectural state preserved in the checkpoint.

For simplicity, we divide the checkpoints into "unset," "active," and "inactive" checkpoints. An unset checkpoint is a checkpoint that processor 102 is not currently using. An active checkpoint (of which there is only one at a time) is a checkpoint that is in use and is the checkpoint to which processor 102 returns in the event that a return to a most-recently checkpointed state is to be made. An inactive checkpoint is any other checkpoint that is in use, but is not the active checkpoint.

For example, assume that processor 102 supports three checkpoints, and that two of the checkpoints are set (i.e., processor 102 has used two of the checkpoints for preserving the architectural state at a particular time). The third checkpoint is not in use and hence is unset, while the second checkpoint is active, and the first checkpoint is set, but inactive. If processor 102 encounters a condition that causes processor 102 to return to a most-recently checkpointed state, processor 102 restores the second (active) checkpoint.

Note that, in these embodiments, processor 102 can also encounter a condition that causes processor 102 to return to a particular checkpoint (e.g., an error condition caused by an instruction that began execution while a given checkpoint was active). For example, assuming the checkpoints described above, processor 102 can encounter a store buffer overflow associated with a store instruction that began execution while the first checkpoint was active, which causes processor 102 to restore the first checkpoint (and discard the second checkpoint).

In the described embodiments, to support multiple checkpoints, processor 102 includes multiple copies of the structures used for preserving the architectural state when the checkpoint was generated. For example, assuming an embodiment where processor 102 maintains multiple copies of the architectural state to enable freezing one of the copies to preserve the architectural state, processor 102 can maintain a separate copy of the architectural state for each checkpoint. Alternatively, processor 102 can maintain a shadow copy of the architectural state for each checkpoint, and can switch to a new shadow copy to record updates made following the generation of the corresponding checkpoint.

In addition, processor 102 can include mechanisms for tracking the number of outstanding checkpoints and for associating operations with a corresponding checkpoint. For example, in some embodiments, during speculative execution, processor 102 holds speculative store operations in entries in a store buffer to prevent the data in the speculative store from changing the state of the memories in the memory hierarchy outside of the processor before the speculative episode is successfully completed. In some of these embodiments, each of the entries in the store buffer can include a checkpoint indicator that processor 102 uses to indicate the checkpoint that the buffered store is associated with.

As another example, in some embodiments, processor 102 includes two or more deferred queues. Each deferred queue is associated with a particular checkpoint. Instructions that are deferred during the speculative episode following the associated checkpoint are stored in a given deferred queue. In some embodiments, the deferred queue is a single structure, but includes one or more pointers or indicators to indicate where deferred instructions following a given checkpoint are located in the deferred queue. In these embodiments, when all of the instructions in a deferred queue for a checkpoint (or in the portion of the deferred queue for a checkpoint) have been executed, processor 102 can determine whether the speculative episode is complete.

In the described embodiments, each checkpoint is "retired" or discarded when the associated speculative episode is successfully completed. In some of these embodiments, the checkpoints are retired in order. Thus, if a first checkpoint is generated at time X, and a second checkpoint is generated at time X+N, the first checkpoint is retired before the second checkpoint. In these embodiments, each outstanding operation associated with a checkpoint, therefore, is completed before the checkpoint can be retired. For example, long-latency instructions initiated while a given checkpoint was the active checkpoint complete execution before the checkpoint is retired.

Examples of processors with mechanisms for generating multiple checkpoints can be found in U.S. Pat. No. 7,571,304, entitled "Generation of Multiple Checkpoints in a Processor that Supports Speculative Execution," by inventors Shailender Chaudhry, Marc Tremblay, and Paul Caprioli and U.S. Pat. No. 7,475,230, entitled "Method and Apparatus for Performing Register File Checkpointing to Support Speculative Execution within a Processor," by inventors Yuan Chou and Santosh Abraham, which are hereby incorporated by reference to describe some mechanisms for generating multiple checkpoints in a processor.

Generating Multiple Checkpoints During Speculative Execution

In the described embodiments, monitoring mechanism 210 in processor 102 determines when to generate checkpoints while speculatively executing instructions. More specifically, monitoring mechanism 210 determines when an additional of the multiple checkpoints supported by processor 102 may be generated to help avoid the possible loss of computational work performed during speculative execution since a previous checkpoint was generated.

Generally, monitoring mechanism 210 monitors operating conditions and/or instructions encountered while speculatively executing instructions to determine when the operating conditions and/or instructions indicate that processor 102 is likely, or guaranteed, to restore a checkpointed architectural state and resume operation from the restored architectural state. When monitoring mechanism 210 determines that an encountered operating condition and/or instruction indicates that an additional checkpoint should be generated, monitoring mechanism 210 signals processor 102 to generate a checkpoint. (Although processor 102 may not generate the additional checkpoint, as is described in more detail below.)

When monitoring instructions encountered during speculative execution, monitoring mechanism 210 can monitor the instructions anywhere in pipeline 112 or processor 102. For example, monitoring mechanism 210 can monitor instructions that are being fetched for execution, decoded, executed, processed after generating a trap, and/or committed to the architectural state of processor 102. In addition, monitoring mechanism 210 can monitor the control values, input sources and/or output destinations (registers, cache lines, buffers, state registers or values, etc.) for instructions. Upon encountering a predetermined instruction and/or combination of instructions during speculative execution, monitoring mechanism 210 can determine that a checkpoint should be generated. Generally, monitoring mechanism 210 can signal processor 102 to generate a checkpoint for any instruction or combination of instructions that is likely or guaranteed to cause processor 102 to restore a checkpointed state.

In some embodiments, monitoring mechanism 210 can also keep track of a number of instructions executed since a previous checkpoint was generated, and when a threshold number of instructions have been executed, monitoring mechanism 210 can determine that a checkpoint should be generated. As described below, the number of instructions between checkpoints can be dynamically adjusted by processor 102.

In these embodiments, the instructions that cause monitoring mechanism 210 to signal processor 102 to generate an additional checkpoint can include any instructions that cause, or are likely to cause, processor 102 to transition from execute-ahead mode 302 or deferred-execution mode 304 to scout mode 306 (because processor 102 is guaranteed to return to a checkpoint from scout mode). For example, these instructions include atomic instructions (e.g., a compare-and-swap (CAS) instruction), memory coherency instructions (e.g., a MEMBAR instruction, etc.), divide instructions, and other instructions. In addition, the instructions can include instructions that cause or are likely to cause processor 102 to immediately fail speculative execution and restore the checkpoint (i.e., without transitioning to scout mode 306 from execute-ahead mode 302 or deferred-execution mode 304).

Another example of an instruction that can cause monitoring mechanism 210 to signal processor 102 to generate a checkpoint is the COMMIT instruction that can be included in embodiments that support transactional execution. In these embodiments, the COMMIT instruction can be used to commit transactional results to the architectural state of processor 102. When committing the transactional results following a COMMIT instruction, if another (i.e., post-transactional) instruction interferes with the transaction, processor 102 can be forced to abort the transaction, restore the checkpointed pre-transactional state, and resume operation from the checkpoint (thereby losing all the computational work for a transaction that had actually completed successfully and was being committed). Hence, some embodiments generate a checkpoint at the instruction immediately following the COMMIT instruction to enable processor 102 to return to that instruction, instead of re-executing the entire transaction.

An example of a combination of instruction that can cause monitoring mechanism 210 to signal processor 102 to generate a checkpoint is the combination of the SAVE and RESTORE instructions for manipulating register windows (note that register windows are known in the art and hence are not described in more detail). More specifically, in embodiments where processor 102 is configured to use register windows, the register window operations supported by processor 102 include the SAVE operation, which causes processor 102 to advance to a next register window in a predetermined sequence (thereby saving the register window), and the RESTORE operation, which causes processor 102 to fall back to the immediately prior register window (thereby restoring the prior register window). In these embodiments, monitoring mechanism 210 monitors the instructions being executed to determine when a SAVE instruction is followed by a RESTORE instruction. Because a SAVE instruction followed by a RESTORE instruction causes processor 102 to transition from execute-ahead mode 302 to scout mode 306, upon determining that a register window RESTORE operation has been encountered following a register window SAVE operation, processor 102 can generate a checkpoint.

When monitoring operating conditions encountered during speculative execution, monitoring mechanism 210 can monitor the condition(s) and/or state(s) of structures, variables, circuits, and mechanisms in processor 102 and/or computer system 100. For example, monitoring mechanism 210 can monitor hardware structures used for executing instructions (e.g., a store buffer, deferred buffer 208, etc.) to determine when the hardware structures are in a condition that renders the hardware structure partially or completely inaccessible during a speculative episode. Upon encountering a predetermined operating condition during speculative execution, monitoring mechanism 210 can determine that a checkpoint should be generated.

An example of an operating condition that can cause monitoring mechanism 210 to signal processor 102 to generate a checkpoint is the overflow of a hardware structure, such as a store buffer. More specifically, in some embodiments, processor 102 includes a store buffer that holds outstanding store operations until processor 102 commits the stores and the corresponding data in the architectural state of computer system 100. As described above, in some embodiments, speculative store operations are held in the store buffer during a speculative episode, and are not committed to the architectural state of computer system 100 until the speculative episode successfully completes. Because speculative stores cannot drain from the store buffer, during a speculative episode, the store buffer may receive more speculative stores than there are entries in the store buffer. In this case, the store buffer "overflows." Because the speculative state is no longer complete (i.e., one of the speculative stores must be lost due to the overflow), processor 102 immediately restores the most-recently generated checkpoint and resumes operation in normal-execution mode 300 from the restored checkpoint.

In the described embodiments, monitoring mechanism 210 tracks the number of speculative stores in the store buffer and the number of instructions in the pipeline that will perform a store operation (collectively the "outstanding stores"). When the number of outstanding stores is greater than a threshold (i.e., when the store buffer is likely to overflow), monitoring mechanism 210 can determine that a checkpoint can be generated.

Some embodiments include an overflow threshold that is used by monitoring mechanism 210 to determine when to generate a checkpoint based on the number of outstanding stores. In some embodiments, the overflow threshold is computed dynamically by processor 102 and adjusted based on operating conditions. In some of these embodiments, processor 102 can account for the number of times that the store buffer has reached the threshold and then subsequently overflowed/not overflowed when dynamically determining the overflow threshold. In these embodiments, if the store buffer reaches the threshold often, but overflows less than a certain percentage of these times (e.g., less than 20%, 10%, or another percentage), the mechanisms can adjust the threshold upward, so that the store buffer can hold more buffered stores before the mechanism determines that a store buffer overflow is likely. In addition, the computation can take into account the memory system bandwidth, the retirement rate of stores, the number of cache line misses, and other computer system 100 or processor 102 operating conditions that can change the drain rate of the store buffer.

In some embodiments, the mechanisms can also consider a number of non-speculative stores in the store buffer when determining whether the store buffer will overflow. In these embodiments, although the non-speculative stores can drain from the store buffer during a speculative episode, if the non-speculative stores prevent a speculative store from entering the store buffer, the effect is the same as with an overflow of speculative stores.

In some embodiments, monitoring mechanism 210 also keeps track of the number of deferred instructions in deferred buffer 208. In a similar way to the store buffer described above, as the number of deferred instructions in deferred buffer 208 reaches a threshold, monitoring mechanism 210 can determine that a checkpoint can be generated. Note that these embodiments can also dynamically compute the threshold in a similar way to the computation of the threshold for the store buffer.

Another example of an operating condition that can cause monitoring mechanism 210 to signal processor 102 to generate a checkpoint is the execution of a branch instruction that is likely to be mispredicted. In order to enable the detection of such branch instructions, some embodiments include a branch fail cache that holds identifiers (e.g., a program counter for the branch, etc.) for branch instructions that have been mispredicted. Note that in these embodiments the branch fail cache is generally a smaller memory structure than a common branch prediction cache, and contains no "prediction" for the branch, but instead only holds a record of branches that have been mispredicted. In these embodiments, when executing a branch instruction, monitoring mechanism 210 can compare the program counter for the branch instruction to the entries in the branch fail cache to determine whether the branch has been previously mispredicted. If so, the mechanisms can signal processor 102 that a checkpoint should be generated (i.e., to avoid returning to a previously generated checkpoint in the event that the branch is mispredicted).

Computation of Checkpoint Factor

In some embodiments, processor 102 may not automatically generate a checkpoint upon receiving the signal from monitoring mechanism 210. Instead, upon receiving the signal from monitoring mechanism 210, processor 102 may cause determining mechanism 212 to compute a factor that processor 102 can then use to determine whether or not the checkpoint is to be generated. In these embodiments, the factor computed by determining mechanism 212 can indicate whether the cost of generating the checkpoint (in terms of the computational effort for generating the checkpoint, the reduction in the number of available checkpoints, etc.) is outweighed by the potential benefit of generating the checkpoint (the possibility of returning to the checkpoint, the number of computational operations since the previous checkpoint was generated, etc.). If the factor indicates that the cost of generating the checkpoint is not outweighed by the benefit of having the additional checkpoint, processor 102 may not generate the checkpoint.

In these embodiments, determining mechanism 212 can use any of a number of different operating conditions, performance considerations, and processor state values as inputs for computing the factor. Generally, the inputs used by determining mechanism 212 can include any value that can be used to determine whether the cost of generating the checkpoint is outweighed by the benefit gained by generating the checkpoint. For example, the inputs to the computation of the factor can include, but are not limited to:
  the number of checkpoints remaining;
  the number and/or type of instructions and/or computational operations that have occurred since the previous checkpoint was generated;
  the number and/or type of I/O or memory system operations that have occurred since the previous checkpoint was generated (e.g., memory accesses, disk writes, cache misses, translation lookaside buffer misses, etc.);
  past, current, or projected future processor performance metrics (e.g., instructions per cycle, processor core usage percentage, memory system bandwidth, store buffer drain rate, stores in flight, etc.);
  the number of hardware-initiated events that have caused processor 102 to return to a checkpoint.

In some embodiments, the input values used in computing the factor can be selected by determining mechanism 212 based on the operating condition and/or instruction(s) that caused monitoring mechanism 210 to signal processor 102 to generate a checkpoint. For example, assume that processor 102 has requested determining mechanism 212 to compute the factor because monitoring mechanism 210 detected that processor 102 encountered a branch instruction that the branch fail cache indicates is likely to be mispredicted. In this case, the inputs can be selected based on a previously generated checkpoint and/or the fact that the computation of the factor has been requested due to a potentially mispredicted branch instruction. Thus, when computing the factor, determining mechanism 212 can select one or more of the following inputs: (1) the number of instructions since the last checkpoint was generated; (2) the number of unset checkpoints remaining; (3) the number of speculative and/or non-speculative values then being held in processor structures (i.e., in the store buffer, etc.); (4) the number of times that branch instructions indicated as likely to be mispredicted have turned out to be actually mispredicted; and (5) the amount(s) and type(s) of activity of processor 102 since the previous checkpoint was generated (e.g., bandwidth usage, cache reads or misses, I/O activity, etc.).

In some embodiments, the factor is a numerical value. For example, the factor can be a value between 0 and X. In these embodiments, the likelihood of setting the checkpoint increases as the outcome of the computation approaches X. For example, in some embodiments, the factor is a value from 0-1, where 1 indicates that the checkpoint is very likely or guaranteed to be generated, while 0 indicates that the checkpoint is very unlikely to be generated or is guaranteed not to be generated.

In some embodiments, the inputs to determining mechanism 212 are representative numerical values. In these embodiments, values (e.g., processor core usage percentage, memory system bandwidth usage, etc.) can be converted to a value that represents a proportion of an expected value or directly represents the value. For example, assuming that processor core usage percentage is used as an input, processor 102 can convert the percentage directly into a value between 0 and 1 for use as an input in computing the factor. As another example, assuming that the input is the number of times that a branch instruction with an entry in the branch fail cache has turned out to be mispredicted, the processor can use a saturating counter to keep track of the branch mispredicts for corresponding branches in a given time period (and can potentially convert the counter to a value, e.g., between 0 and 1).

In some embodiments, the additional checkpoint can be generated if what appears to be a high likelihood of restoring the most-recently generated checkpoint has actually turned out to be correct in past instances. In these embodiments, processor 102 includes a variable or setting that keeps a running tabulation of the proportion of times when an additional checkpoint is returned to by processor 102.

Also, because the number of resources for generating checkpoints on the processor is generally limited, processor 102 may not generate later checkpoints unless a return to a checkpoint is guaranteed or very likely. In these embodiments, processor 102 can avoid the situation where processor 102 uses all available checkpoints in the first few instructions of a speculative episode, executes hundreds or thousands of instructions while all checkpoints are already in use, and then encounters a condition and/or instruction that causes processor 102 to return to the most-recently generated checkpoint (thereby requiring processor 102 to re-perform a significant amount of computational work).

Generation of Additional Checkpoints Based on the Number of Instructions Executed Since the Last Checkpoint was Generated As described above, in some embodiments, monitoring mechanism 210 can keep track of the number of instructions executed by processor 102 and can signal processor 102 to generate a checkpoint upon executing a given number of instructions since a last checkpoint was generated.

In some embodiments, monitoring mechanism 210 is configured so that the checkpoints can be generated at a predetermined arithmetically computed interval. Generally, these embodiments can use any arithmetic interval that can be computed by monitoring mechanism 210 or processor 102. As one simplified example, in some embodiments, the arithmetic interval can be an exponential interval (e.g., a checkpoint can be generated at 10 instructions, then 100 instructions ($10^2$), then at 1000 instructions ($10^3$).

In some embodiments, the number of instructions between checkpoints can be dynamically adjusted by processor 102 to account for the operating conditions in processor 102. For example, in some embodiments, the processor can dynamically adjust the number of instructions between checkpoints based on the number of checkpoints remaining in the processor, the operating state of the processor (e.g., low-power mode, etc.), the number of reads/writes to mass-storage device 110, the number of cache misses, the type of program being executed, the priority of the thread, or for another reason.

In some embodiments, the number of instructions can be adjusted based on the number of times that the generated checkpoints are restored/returned to by processor 102. In these embodiments, monitoring mechanism 210 or processor 102 can keep a record of checkpoints that were generated based on a number of instructions having been executed following a previous checkpoint, and a record of how many (and perhaps which) of these checkpoints processor 102 restores/returns to.

In some embodiments, the processor includes a software-adjustable switch or a programmable register that can be set to cause the processor to generate checkpoints more often, or to generate checkpoints at a given interval.

Processes for Generating Checkpoints

Figure 4:
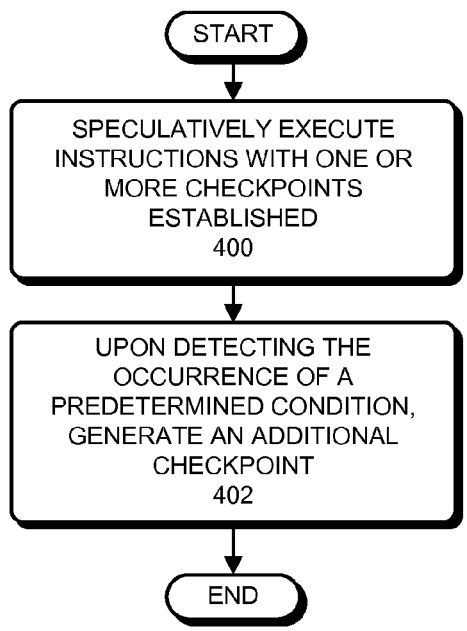
FIG. 4 presents a flowchart illustrating a process for generating an additional checkpoint in a processor that supports speculative execution in accordance with the described embodiments.

FIG. 4 presents a flowchart illustrating a process for generating an additional checkpoint in a processor that supports speculative execution in accordance with the described embodiments. The process in FIG. 4 starts with processor 102 speculatively executing instructions from program code with one or more checkpoints established (step 400). For this example, any number of checkpoints can have previously been established, from as few as a single checkpoint (e.g., the checkpoint generated on commencing speculative execution) to as many as N−1 checkpoints (where processor 102 supports N checkpoints).

Upon monitoring mechanism 210 detecting the occurrence of a predetermined condition, monitoring mechanism 210 signals processor 102 to generate an additional checkpoint (step 402). As described above, encountering the predetermined condition can include encountering an operating condition of processor 102 and/or a predetermined instruction.

FIG. 5 presents a flowchart illustrating a process for generating an additional checkpoint in a processor that supports speculative execution in accordance with the described embodiments. The process in FIG. 5 starts with processor 102 speculatively executing instructions from program code with one or more checkpoints established (step 500). As described above, processor 102 can have any number of checkpoints previously established, as long as one checkpoint is available.

Upon monitoring mechanism 210 detecting the occurrence of a predetermined condition, monitoring mechanism 210 signals processor 102 to generate an additional checkpoint. Unlike the embodiment shown in FIG. 4, in the embodiment shown in FIG. 5, processor 102 requests determining mechanism 212 to compute a factor based on one or more operating conditions (step 502). In these embodiments, as described above, the factor can be a numerical value that is computed using one or more operating conditions, performance considerations, and processor state values as inputs for computing the factor.

Processor 102 then compares the factor computed by determining mechanism 212 to a threshold value to determine whether the factor is greater than the threshold value. If so, processor 102 generates the additional checkpoint (step 504). In these embodiments, using the factor to determine whether or not to generate the additional checkpoint can enable processor 102 to avoid generating checkpoints in cases where the checkpoint is not likely to help processor 102 avoid re-performing a significant amount of computational work. For example, in some embodiments, determining mechanism 212 can be configured so that the factor is scaled according to how many checkpoints are available in processor 102, how many instructions have been executed since the last checkpoint was generated, etc.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for generating a checkpoint in a processor, comprising:
    while the processor is speculatively executing instructions with one or more checkpoints in use:
        upon detecting an occurrence of a predetermined operating condition, determining if an additional checkpoint is to be generated by:
            computing a factor based on one or more operating conditions of the processor; and
            when the factor is greater than a predetermined value, generating the additional checkpoint,
    wherein detecting the occurrence of the predetermined operating condition involves determining that a given queue for the processor, which comprises at least one of a store queue for stores and a deferred queue, is likely to be unavailable for future speculative use by using a number of instructions in a pipeline in the processor that will use a slot in the given queue, wherein using the number of instructions in the pipeline comprises performing a computation using a number of outstanding stores in the pipeline and a number of stores in the store queue.

2. The method of claim 1, wherein detecting the occurrence of the predetermined operating condition involves:
   determining that one or more hardware structures in the processor are likely to be unavailable for future speculative use.

3. The method of claim 2, wherein determining that one or more hardware structures in the processor are likely to be unavailable involves:
   determining that one or more queues, which comprise at least one of a store queue and a deferred queue, have reached a predetermined level of fullness during speculative execution.

4. The method of claim 2, wherein determining that one or more hardware structures in the processor are likely to be unavailable involves determining that the one or more queues have reached a given level of fullness during speculative execution, and wherein the method further comprises:
   computing a likelihood of overflowing the one or more queues based on at least one of: a number of previous overflows or no-overflows; a number of slots available in the one or more queues; a number of instructions in a pipeline in the processor that will use a slot in the one or more queues; a drain rate of the one or more queues; or a bandwidth availability of one or more subsystems used to drain the one or more queues; and
   dynamically computing the given level of fullness for each queue in the deferred queue and the store queue based on the likelihood of overflowing the one or more queues.

5. The method of claim 1, wherein detecting the occurrence of the predetermined operating condition comprises:
   determining that one or more instructions have been encountered that are likely or guaranteed to cause the processor to return to a checkpoint.

6. The method of claim 5, wherein the one or more instructions comprise at least one of:
   a divide instruction;
   a register window RESTORE instruction following a register window SAVE instruction, wherein the RESTORE instruction and the SAVE instruction are executed during speculative execution;
   an atomic instruction; and
   a COMMIT instruction.

7. The method of claim 1, wherein detecting the occurrence of the predetermined operating condition involves:
   determining that a branch instruction has been encountered;
   checking a branch fail cache for an entry that includes an identifier for the branch instruction, wherein the branch fail cache includes a set of entries, each of which can hold an identifier of a branch instruction that was mispredicted in a previous execution of the branch instruction; and
   detecting the occurrence of the predetermined operating condition when an entry in the branch fail cache indicates that the branch was previously mispredicted.

8. The method of claim 1, wherein detecting the occurrence of the predetermined operating condition involves:
   using a mathematical formula to compute a number of instructions at which a checkpoint is to be generated; and
   detecting the occurrence of the predetermined operating condition when the processor has executed the computed number of instructions without generating a checkpoint.

9. The method of claim 8, wherein the mathematical formula includes at least one variable that is set based on at least one operating condition of the processor.

10. The method of claim 1, wherein computing the factor based on the one or more operating conditions of the processor involves computing an output of a function, wherein a set of inputs to the function includes one or more values representing:
    a prior, present, or projected future performance of the processor;
    a number of remaining checkpoints;
    a number or type of instructions that have been executed since a previous checkpoint was generated;
    a number or type of computational operations that have occurred since a previous checkpoint was generated;
    a user-input adjustment;
    a processing-system-specific adjustment; or
    the predetermined operating condition.

11. The method of claim 1, wherein generating the checkpoint includes preserving an architectural state of the processor to enable the processor to be returned to an earlier operating state.

12. An apparatus for generating checkpoints, comprising:
    a processor, wherein, while speculatively executing instructions with one or more checkpoints in use, upon detecting an occurrence of a predetermined operating condition, the processor is configured to determine whether an additional checkpoint is to be generated by:
    computing a factor based on one or more operating conditions of the processor; and
    when the factor is greater than a predetermined value, the processor is configured to generate the additional checkpoint,
    wherein detecting the occurrence of the predetermined operating condition involves determining that a given queue for the processor, which comprises at least one of a store queue for stores and a deferred queue, is likely to be unavailable for future speculative use by using a number of instructions in a pipeline in the processor that will use a slot in the given queue, wherein using the number of instructions in the pipeline comprises performing a computation using a number of outstanding stores in the pipeline and a number of stores in the store queue.

13. The apparatus of claim 12, wherein when detecting the occurrence of the predetermined operating condition, the processor is configured to determine that one or more hardware structures in the processor are likely to be unavailable for future speculative use.

14. The apparatus of claim 13, wherein when determining that the one or more hardware structures in the processor are likely to be unavailable, the processor is configured to determine that one or more queues, which comprise at least one of a store queue and a deferred queue, have reached a predetermined level of fullness during speculative execution.

15. The apparatus of claim 13, wherein when determining that the one or more hardware structures in the processor are likely to be unavailable, the processor is configured to determine that one or more of a store queue or a deferred queue have reached a given level of fullness during speculative execution, and
    wherein the processor is further configured to:
    dynamically compute the given level of fullness for each queue in the one or more queues based on a likelihood of overflowing the one or more queues, wherein the processor is configured to compute the likelihood of overflow based on at least one of:
    a number of previous overflows or no-overflows;
    a number of slots available in the one or more queues;

a number of instructions in a pipeline in the processor that will use a slot in the one or more queues;
a drain rate of the one or more queues; or
a bandwidth availability of one or more subsystems used to drain the one or more queues.

16. The apparatus of claim 12, wherein, when detecting the occurrence of the predetermined operating condition, the processor is configured to determine that one or more instructions have been encountered that are likely or guaranteed to cause the processor to return to a checkpoint.

17. The apparatus of claim 12, wherein the apparatus further comprises:
a branch fail cache in the processor, wherein the branch fail cache includes a set of entries, each of which can hold an identifier of a branch instruction that was mispredicted in a previous execution of the branch instruction;
wherein when detecting the occurrence of the predetermined operating condition, the processor is configured to:
determine that a branch instruction has been encountered;
check the branch fail cache for an entry that includes an identifier for the branch instruction; and
detect the occurrence of the predetermined operating condition when an entry in the branch fail cache indicates that the branch was previously mispredicted.

18. The apparatus of claim 12, wherein, when detecting the occurrence of the predetermined operating condition, the processor is configured to:
use a mathematical formula to compute a number of instructions at which a checkpoint is to be generated; and
detect the occurrence of the predetermined operating condition when the processor has executed the computed number of instructions without generating a checkpoint.

19. The apparatus of claim 18, wherein the mathematical formula includes at least one variable that is set based on at least one operating condition of the processor.

20. The apparatus of claim 12, wherein, when computing the factor based on the one or more operating conditions of the processor, the processor is configured to compute an output of a function, wherein a set of inputs to the function includes one or more values representing:
a prior or present performance of the processor;
a number of remaining checkpoints;
a number or type of instructions that have been executed since a previous checkpoint was generated;
a number or type of computational operations that have occurred since a previous checkpoint was generated;
a user-input adjustment;
a processing-system-specific adjustment; or
the predetermined operating condition.

* * * * *